United States Patent [19]

Hopkins, Jr.

[11] 4,134,131
[45] Jan. 9, 1979

[54] DIGITAL VIDEO SYNCHRONIZER

[75] Inventor: Robert S. Hopkins, Jr., Marlton, N.J.

[73] Assignee: RCA Corporation, New York, N.Y.

[21] Appl. No.: 755,948

[22] Filed: Dec. 30, 1976

[30] Foreign Application Priority Data

Mar. 19, 1976 [GB] United Kingdom ............... 11112/76

[51] Int. Cl.² .......................... H04N 5/04; H04N 5/78
[52] U.S. Cl. ......................................... 358/149; 358/4;
360/33
[58] Field of Search ...................... 358/4, 8, 22, 17, 19,
358/148, 149, 127; 360/10, 11, 32, 33, 35, 36

[56] References Cited

U.S. PATENT DOCUMENTS

| 3,909,839 | 9/1975 | Inaba et al. | 358/8 |
| 4,007,486 | 2/1977 | Inaba et al. | 358/8 |
| 4,018,990 | 4/1977 | Long et al. | 358/19 |

Primary Examiner—John C. Martin
Attorney, Agent, or Firm—Eugene M. Whitacre; Paul J. Rasmussen; Robert L. Troike

[57] ABSTRACT

A television signal synchronizer is provided in which non-synchronous signals are written into memory storage, while previously stored video signals are read-out of the memory storage synchronous with a local reference. A memory control circuit, responsive to the write and read ready signals, prevents the simultaneous reading and writing of the memory storage by generating memory control signals for reading stored video signals out of the memory at a periodic rate synchronous with the read signal, while generating write-into memory control signals at a non-periodic rate determined by the same read signal.

3 Claims, 14 Drawing Figures

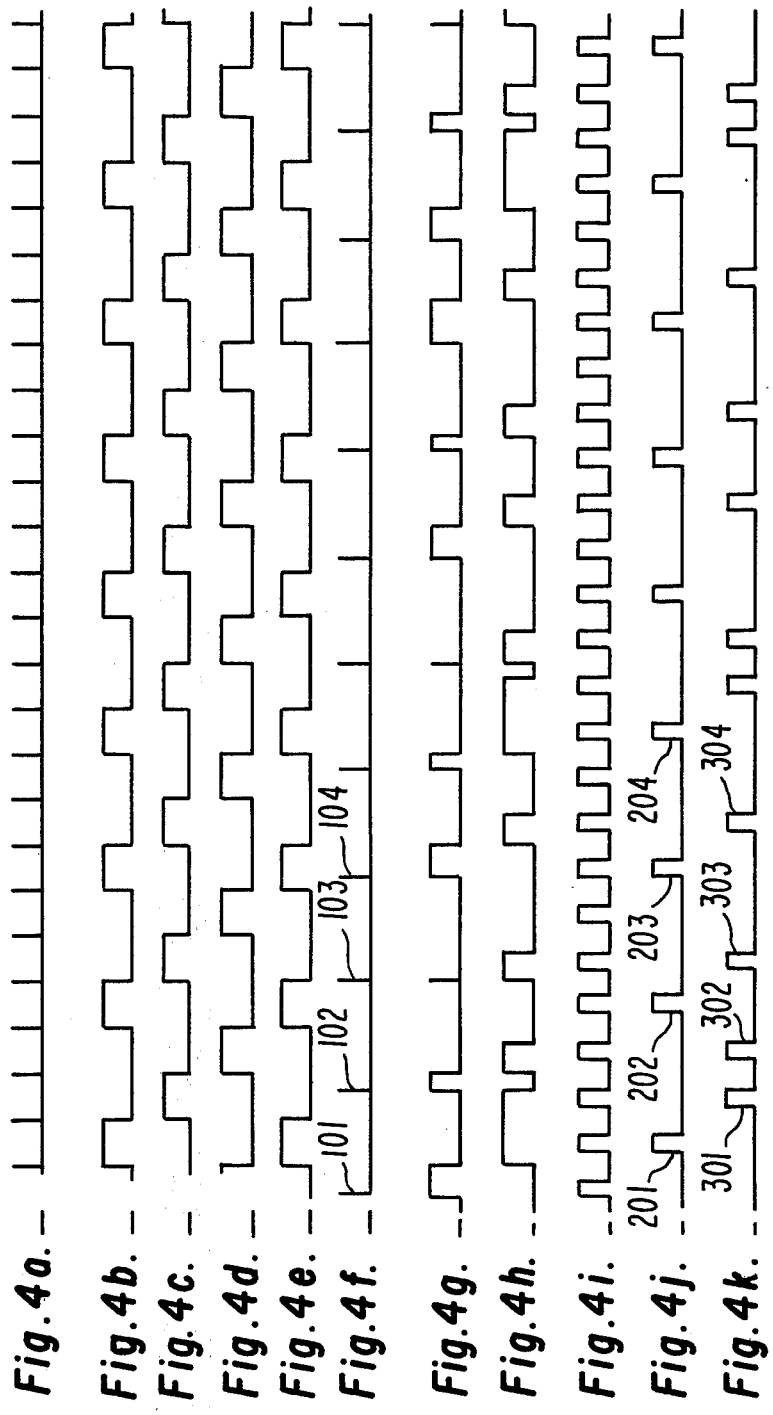

DIGITAL VIDEO SYNCHRONIZER

BACKGROUND OF THE INVENTION

This invention relates to television synchronization apparatus and especially to apparatus for synchronizing the television signals from two or more non-synchronous sources of video information.

In modern television programming, it is generally necessary to integrate a mix of external and studio video sources smoothly into live programs. An example of such a requirement is the increasing use of Electronic Journalism (EJ) facilities for on-the-spot new broadcasts. The wide diversification of such program sources has emphasized the need for synchronizing systems to incorporate non-synchronous video signals originating outside the local studio. Integrading a non-synchronous source into an existing program presents a serious production problem, since it is necessary to gen-lock studio sync to the outside signal or to use additional sync generators for the proper timing reference. Gen-locking to the external non-synchronous source is particularly troublesome in that only source at a time may be utilized and that source tends to disrupt the internal studio sync timing. The use of multiple sync generators is expensive and creates further operational difficulties in maintaining gen-lock between the multiple generators. Similar problems are encountered in network cable and satellite transmission systems even though expensive rubidium standards are used because changes in the electrical path length causes the color phase of the video signal to drift, even though the horizontal signal timing component may be relatively stable.

A video synchronizer may be advantageously used to overcome the problems of incorporating non-synchronous program sources into a local studio broadcast where the conventional gen-locking methods described above do not provide a satisfactory solution. A video synchronizer is primarily a digital device, which accepts a non-synchronous video signal input from any external source, converts the signal from analog to digital format; stores the digitized signal in a memory; converts the digital signal back to analog form and processes the reconverted signal through a signal processing amplifier wherein sync, blanking and color burst signals are added to the output video signal. The digitized video information stored in memory is read out of the memory at a rate which is synchronous with the local studio sync generator timing. Since the reconstituted video signal is now completely synchronous with the local studio reference, it may be used directly for mixing, special effects, etc., similar to the manner in which a live camera, a video tape machine or other studio source is used.

SUMMARY OF THE INVENTION

A system for processing video information signals is provided in which incoming video signals are written into memory storage means while previously stored video information signals are read-out of said memory storage means. The system comprises input means coupled to a source of incoming video information signals and first reference means coupled to the input means for generating a first reference signal synchronized with the incoming video information. First processing means are coupled to the input means and to the first reference means for processing the video information signals in synchronism with the first reference signal prior to writing into the memory storage means. Second reference means for generating a second reference signal and second processing means coupled to output means and to the second reference means for processing the stored video information signals read-out of the storage means. Memory control means, responsive to said first and second reference signals, are coupled to the memory storage means for generating read and write memory storage control signals whereby the read control signal reads the stored video information out of the memory storage means at a periodic rate synchronous with the second reference signal while the write control signal writes the incoming video signal information into the memory storage means at a non-periodic rate determined by the same second reference signal.

BRIEF DESCRIPTION OF THE DRAWINGS

FIGS. 4a–4k illustrates waveforms depicting the operation of the block diagram of FIG. 3.

DESCRIPTION OF THE INVENTION

Figure 1:
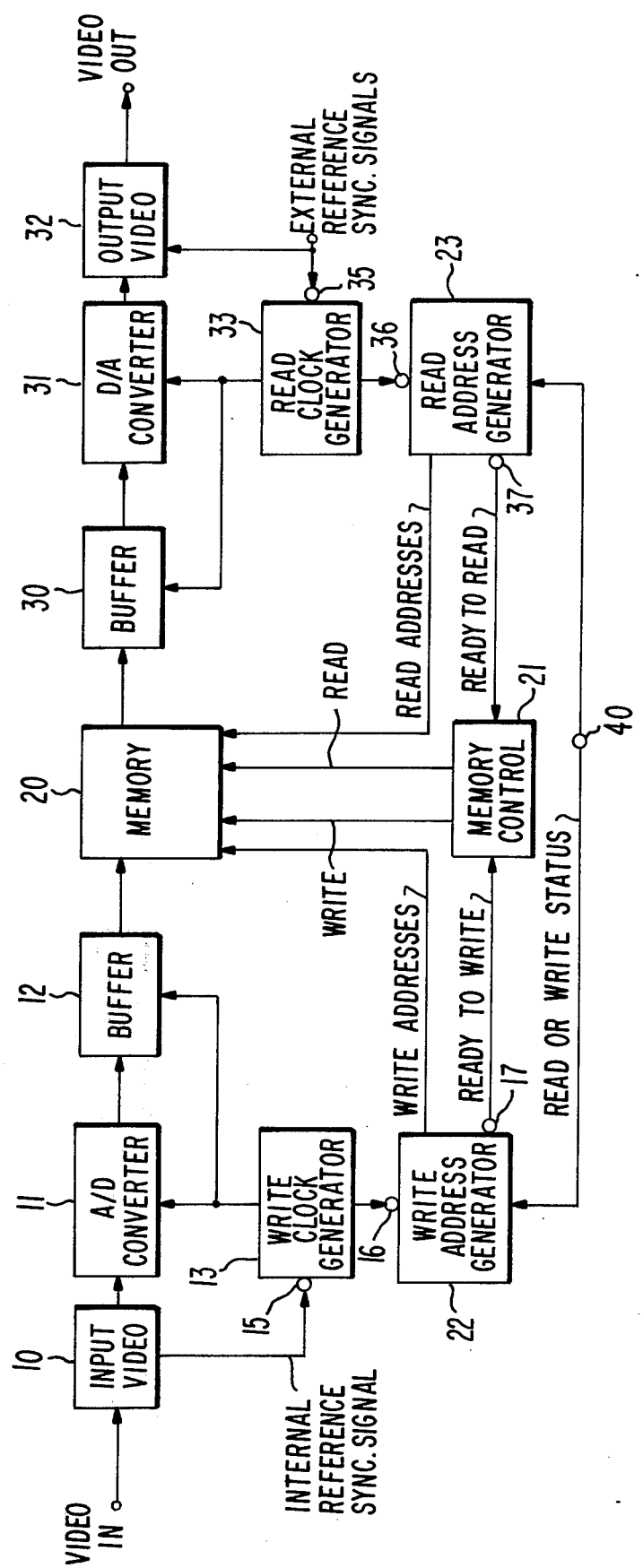
FIG. 1 is a block diagram of a television signal synchronizer embodying the present invention.

In FIG. 1, a signal (Video In) from a non-synchronous source, such as an Electronic Journalism (EJ) camera, is coupled to an input terminal of an input video processor 10 in which the incoming video signal synchronizing components and burst timing information are separated from the active picture information. The separate timing information is coupled to a write clock generator 13 which develops timing information in the form of 14.3 MHz pulses (four times the NTSC subcarrier frequency of 3.58 MHz), snychronous with the incoming signal timing information, for enabling an analog-to-digital (A/D) converter 10, buffer 12 and write address generator 22. The active picture information portion of the incoming video signal is bandwidth limited to 5.5 Megahertz in the input video processor 10 and coupled from the output terminal of video processor 10 to the input terminal of A/D converter 11, of known form, where the signal is converted (sampled at a 14.3 Megahertz word rate) into digital form consisting of 8 bit parallel code words.

The signal output of A/D converter 10, in the form of a digitally sampled input video signal, is coupled to a buffer 12 and, in turn, to picture memory 20 for storage. The digital picture information signal is stored at discrete locations in the memory in accordance with specific address codes referenced to burst, vertical and horizontal sync signals generated by the write address generator 22 in response to the related incoming signal timing information generated in the write address clock.

Figure 2:
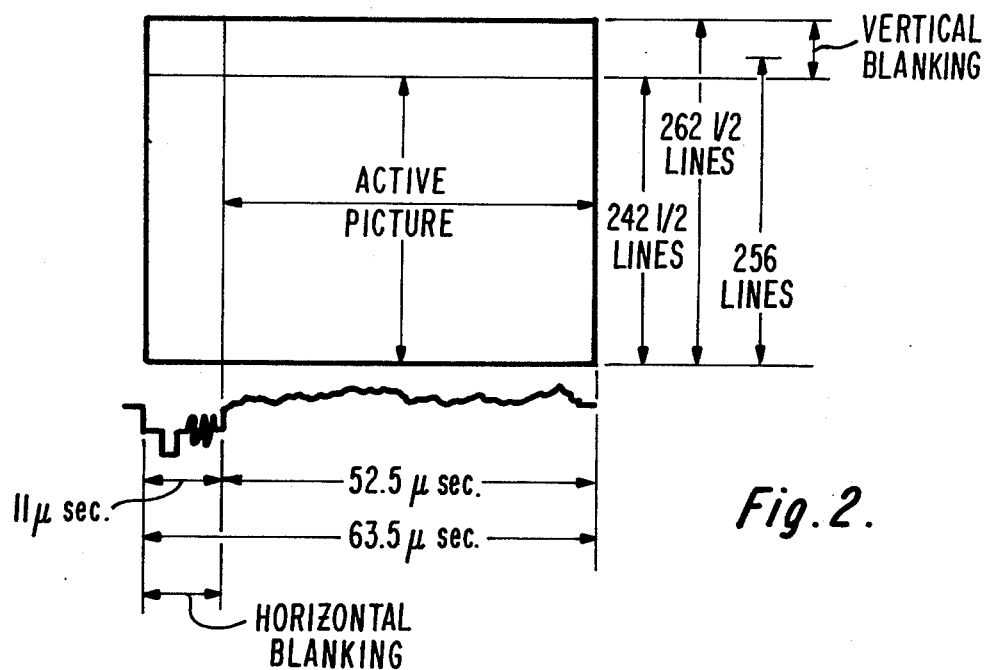
FIG. 2 illustrates in graphical form typical television line and field standards useful in understanding the invention.

Memory 20 is constructed, for example, with memory integrated circuits, such as the Fairchild 40965DC RAM. A typical integrated circuit RAM of the type described has a storage capacity of 4096 bits of information. The total capacity of the memory 20 is determined by the number of bits of information desired to be stored. In a typical synchronizer of the type illustrated in FIG. 1, utilizing a clock rate of 14.3 Megahertz, a field memory store would require 7280 bits of memory (910 samples times 8 bits per sample) for each horizontal line period of 63.5 Microseconds, which yields a total of 1,863,680 bits of memory for storing the 256 lines of information corresponding to the 262½ vertical lines in a full field, as illustrated in FIG. 2. The indicated reduction of vertical line storage from 262½ to 256 is a practical solution to reducing the expensive memory cost consistent with economical memory logic structure. As illustrated in FIG. 2, the active picture area actually comprises 242½ lines with the other 20 lines being utilized for the vertical blanking interval. The vertical blanking interval also contains other signal processing information, such as the Vertical Interval Test Signal (Vits) on lines 17 and 18; Vertical Interval Reference Signal (Virs) on line 19; and the Field Source Identification Signal on line 20 — therefore, it is possible to completely store the 242½ active vertical picture information lines per field as well as the vertical interval signal processing information within the 256 lines of memory by beginning the vertical line information storage at line 15.

If the synchronizer is to be of the full frame variety, which requires the storage of two complete fields, the memory store would require 910 samples per line times 8 bits per sample times 256 lines per field times 2 fields or 3,727,360 bits of memory.

As previously described, the digital picture information is coupled from input video processor 10 to the memory store by means of a buffer 12. Buffer 12 provides a convenient means to overcome a limitation on the data read-in rate of the typical integrated circuit RAM's currently available. The 14.3 MHz clock rate at four times subcarrier was selected to provide sufficient resolution of the picture information being digitized in the A/D convertor; however, the typical RAM data read-in rate is generally limited to a 2 MHz rate. Buffer 12, which is in the form of an 8 word serial-in/parallel-out (SIPO) configuration provides a convenient means of accommodating this difference in data rates. Data is serially read into buffer 12 at the 14.3 MHz rate and may be read-out in parallel form at no more than one-eighth of the read-in rate, thus readily adjusting the incoming signal to the data-into-memory information rate of 2 MHz.

In order to recover the picture information stored in the memory 20, the signal conversion process is reversed as follows: the data stored in memory 20 is read-out of memory 20 into a parallel-in/serial-out (PISO) buffer, which is, in turn, coupled to a digital-to-analog (D/A) converter 31, which converts the 8 bit code word back to a conventional analog picture by timing information and read address generated by read clock generator 33 and read address generator 23, which are synchronized to the local studio reference. The output of D/A converter 31 is coupled to an output video processor 32 in which the blanking interval, sync and burst corresponding to local studio reference are added to the recovered picture information to restore the output video signal to a complete composite video signal, as illustrated in FIG. 2. Thus, the picture information, which was stored in memory 20 from a non-synchronous source is read-out of the memory synchronous with the local studio reference, which makes the signal suitable for programming production requirements of mixing, special effects and switching similar to the manner in which a live camera, VTR tape or other source is used.

Memory control 21 completes the synchronizer of FIG. 1 and includes logic circuitry to be described in detail with reference to FIGS. 3 and 4a –4k, which responds to status signals from the write and read address generators identified in FIG. 1 as a ready-to-write signal indicating that buffer 12 has been clocked full (filled) and is ready to transfer its data status into memory and a ready-to-read signal indicating that buffer 30 has been clocked out (emptied) and is ready to receive new data from the memory, respectively, so as to provide write and read signals to memory 20 to insure that reading and writing into the same address location does not occur simultaneously as would be the case where non-synchronous video sources may drift ahead and behind the fixed local studio reference.

Figure 3:
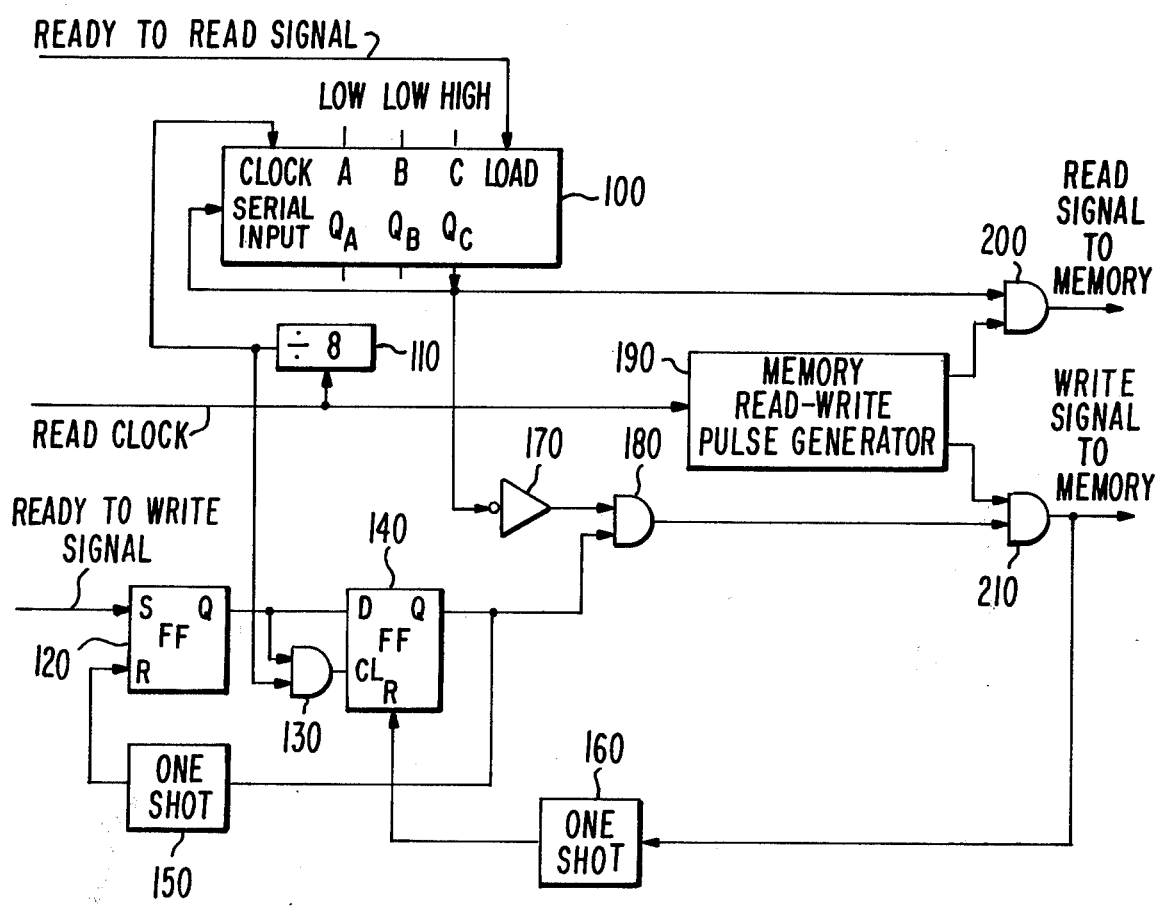
FIG. 3 is a block diagram of the memory control logic embodying the present invention.

In FIG. 3, the read clock signal of read clock generator 33 at a 14.3 MHz rate is coupled to a memory read-write pulse generator 190 in which the clock pulses are retimed and reshaped to meet the requirements of the RAM's utilized in memory 20 of FIG. 1. The resulting continuous read-write pulse train output of pulse generator 190, illustrated by FIG. 4i, is coupled to AND gates 200 and 210, which generate, respectively, the read and write memory control signals in the proper sequence when enabled by the logic circuitry of FIG. 3 in response to the ready-to-read and ready-to-write signals.

As previously described, the circuit configuration of the RAM's does not allow the simultaneous reading and writing of data into memory 20 as may occur where non-synchronous video sources are to be synchronized by the apparatus of FIG. 1 to a local reference. Since it is a requirement of a synchronizer to insure generation of its video output synchronous with the local reference, an enabling signal for AND gate 200 is generated in the following manner. The read clock signal at 14.3 MHz is coupled to a divide-by-eight circuit 110, the output (waveform FIG. 4a) which is, in turn, coupled to the clock input of a circular shift register 100. The function inputs A, B and C of shift register 100 are pre-programmed as LOW-LOW and HIGH, respectively. The ready-to-read signal (waveform 4b) is coupled to the LOAD terminal of shift register 100, and the function outputs $Q_A$, $Q_B$, $Q_C$ provide pulse wavetrain time sequences illustrated by FIGS. 4c, 4d and 4e as the shift register is incremented by the output of the divide-by-eight circuit. Since the function input C of shift register 100 was programmed HIGH, and the LOAD terminal of shift register 100 is also HIGH when the ready-to-read signal is present at the LOAD terminal, the output $Q_C$ of shift register 100 (waveform 4e) is also HIGH synchronous with the ready-to-read signal at a ⅛ duty cycle. The $Q_C$ output is coupled to the serial input of shift register 100 to reset the shift register; to an inverter 170 to disable AND gate 180; and to AND gate 200. AND gate 200 has as its inputs the previously describe read-write output of generator 190 and the $Q_C$ output of shift register 100, corresponding to the ready-to-read signal. The output of AND gate 200, waveform 4j, is coupled to memory storage 20 of FIG. 1 as a memory read control signal, which, in turn, dumps the previously stored data in memory 20 into buffer 30 and D/A converter 31 from which the data is reconverted into an analog video signal, as previously described. The $Q_C$ output signal coupled to inverter 170 is, as was described, at a HIGH level when the ready-to-read signal is present at the LOAD terminal of shift register 100; therefore, the output of inverter 170 is LOW which, when coupled to AND gate 180, prevents a ready-to-write signal being coupled through AND gate 180 to AND gate 210, thereby preventing the simultaneous generation of read and write signals being coupled to memory storage 20. The circuit of FIG. 3, insofar as described, provides a memory read control signal waveform 4j, which is synchronous with the ready-to-read signal waveform 4e; and since the ready-to-read signal was generated by read clock generator 33 of FIG. 1, which was locked to an external (local studio) reference, the video-out signal of the synchronizer of FIG. 1 is now synchronous at a periodic rate with the local studio reference. However, as previously stated, the incoming video signal to the synchronizer of FIG. 1 is generally not synchronous with the local reference. The ready-to-write signal, illustrated by waveform 4f, may occur either before, simultaneous with or after a ready-to-read signal. Since the transfer of data from the input buffer 12 into memory 20 of FIG. 1 is accomplished by a parallel transfer of data, the time required is extremely short, and it is possible to interleave the writing into memory control signals between the regularly spaced ready-to-read control signals, as illustrated in waveform 4k. This is accomplished as follows. A ready-to-write signal, pulse 101 of waveform 4f is coupled to a set-reset flip-flop 120, whose Q output waveform 4g goes HIGH which, in turn, enables the input of a D flip-flop 140, whose Q output goes HIGH after the occurence of the next clock pulse from the divide by eight circuit 110. An AND gate 130, whose inputs are coupled to the Q output of flip-flop 120 and the output of the divide-by-eight circuit, insures that the D flip-flop is operated in synchronism with the timing clock signal of waveform 4a. The HIGH Q output of flip-flop D is coupled to an input of AND gate 180. If $Q_C$ of shift register 100 is LOW, indicating the absence of a ready-to-write signal, the output of inverter 170 is HIGH and AND gate 180 goes HIGH, which enables AND gate 210, which in turn allows the next pulse from generator 190 to appear at the output of AND gate 210 to provide the write control signal to memory 20, which dumps the data from buffer 12 into memory 20; thus, the write control signal 301 of waveform 4k has been interleaved with the ready-to-read control signal at a non-periodic rate governed by the same read clock generator 33. In this manner, the non-synchronous ready-to-write signals are accommodated, as illustrated by the wavetrain 301, 302, 303, 304, etc., of waveform 4k, corresponding to the wavetrain 101, 102, 103, 104, etc., of waveform 4f, being interleaved at a nonperiodic rate with the periodic rate of the ready-to-read control signal shown in the wavetrain 201, 202, 203, 204 of waveform 4j. In order to insure a maximum use of the available time between the periodic read control signals 201, 202, 203, 204, etc., of the wavetrain of FIG. 4j, the set-reset flip-flop 120 is immediately reset by the Q output of the D flip-flop 140 by means of one-shot monostable multivibrator 150. The Q output of the D flip-flop 140 is maintained HIGH until the completion of the write-into-memory control signal at the output of AND gate 210, at which time the D flip-flop 140 is reset by means of one-shot multivibrator 160.

Although the present invention has been described in terms of a composite video signal according to the NTSC television standards, the principles of the invention are equally applicable to other television standards such as PAL, PAL-M, and SECAM. These other standards do contain differences from the NTSC system which require modifications to portions of the synchronizer; among these are: the clock frequencies must be adjusted for differences in subcarrier frequency which determines the number of samples per line, i.e., 4.33 Megahertz in PAL versus 3.58 Megahertz in NTSC. Similarly, the capacity of the memory in terms of lines stored must be adjusted to accommodate the number of vertical lines in each system, typically 625 in PAL, 525 in PAL-M, and 625 in SECAM. In addition, the memory organization and controlling logic must be adjusted to the individual color signal differences in each system such as the eight unique fields in PAL in terms of burst phases sequence as against only four unique fields in terms of the NTSC burst phase sequence, while in SECAM the burst frequency in the form of an undeviated subcarrier alternates on each line but is of a different frequency on each line. The horizontal and vertical synchronizing signals of each television system must also be accommodated in generating the write addresses for writing-into-memory and generating the read addresses for reading-out-of-memory.

What is claimed is:

1. A system for processing video information signals in which incoming video signals are written into memory storage means while previously stored video information signals are read out of said memory storage means, comprising:

input means coupled to a source of incoming video information signals;

first reference means coupled to said input means for generating a first reference signal synchronized with said incoming video information;

first processing means coupled to said input means and to said first reference means for processing said video information signals in synchronism with said first reference signal prior to writing into said memory storage means;

second reference means for generating a second reference signal;

second processing means coupled to output means and to said second reference means for processing said stored video information signals read out of said storage means;

memory control means coupled to said memory storage means and responsive to said first and second reference signals for generating periodic read control pulses being synchronous with said second reference signal and for generating non-periodic write control signals being determined by said second reference signals whereby said read control signal reads said stored video information out of said memory storage means at a periodic rate synchronous with said second reference signal while said write control signal writes said incoming video signal information into said memory storage means at a non-periodic rate determined by said second reference signal.

2. A television signal synchronizer in which incoming video signals are written into memory storage means while previously stored video signals are read out of said memory storage means, comprising:

input means coupled to a source of incoming video information signals;

input write clock means coupled to said input means for generating a write clock signal synchronized with said incoming video information;

first sampling means coupled to said write clock for sampling said video information signal at a rate determined by said write clock signal prior to writing into said memory storage means, said input write clock means developing a ready-to-write signal at the completion of said sampling;

output read clock means for generating a read clock signal;

second sampling means coupled to output means and to said read clock for sampling said stored video information signals read out of said storage means, said output clock means developing a ready-to-read signal prior to said sampling;

memory control means coupled to said memory storage means and responsive to said ready-to-write and said ready-to-read signals for generating periodic read control pulses being synchronous with said read clock signal and for generating non-periodic write control signals being determined by said read clock signal whereby said read control signal reads said stored video information out of said memory storage means at a periodic rate synchronous with said read clock signal while said write control signal writes said incoming video signal information into said memory storage means at a non-periodic rate determined by said read clock signal.

3. A television signal synchronizer according to claim 2 wherein said output read clock is synchronized to a source of local reference for developing a video output signal from said synchronizer which is synchronous with said local reference while said incoming video signal remains non-synchronous relative to said local reference.

* * * * *

UNITED STATES PATENT AND TRADEMARK OFFICE
CERTIFICATE OF CORRECTION

PATENT NO. : 4,134,131

DATED : January 9, 1979

INVENTOR(S) : Robert S. Hopkins, Jr.

It is certified that error appears in the above-identified patent and that said Letters Patent is hereby corrected as shown below:

Column 1, line 13, that portion reading "new" should read -- news --; line 17, that portion reading "Integrading" should read -- Integrating --; line 23, that portion reading "only source" should read -- only one source --; Column 2, line 35, that portion reading "separate" should read -- separated --.

Signed and Sealed this

*Seventeenth* Day of *April 1979*

[SEAL]

*Attest:*

RUTH C. MASON
*Attesting Officer*

DONALD W. BANNER
*Commissioner of Patents and Trademarks*

Disclaimer

4,134,131.—*Robert S. Hopkins, Jr.*, Marlton, N.J. DIGITAL VIDEO SYNCHRONIZER. Patent dated Jan. 9, 1979. Disclaimer filed Mar. 8, 1982, by the assignee, *RCA Corp*.

Hereby enters this disclaimer to all claims of said patent.

[*Official Gazette September 21, 1982.*]